United States Patent
Lai

(10) Patent No.: US 12,452,984 B1
(45) Date of Patent: *Oct. 21, 2025

(54) REPLACEABLE BULB LAMP LED STRING DETECTIVE METHOD AND REPLACEABLE BULB LAMP LED STRING DEVICE

(71) Applicant: POWER MOS ELECTRONICS LIMITED, Wanchai (CN)

(72) Inventor: Cheng-Chang Lai, Taipei (TW)

(73) Assignee: POWER MOS ELECTRONICS LIMITED, Wanchai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/207,897

(22) Filed: May 14, 2025

(51) Int. Cl.
*H05B 47/175* (2020.01)
*H05B 45/50* (2022.01)
*H05B 47/14* (2020.01)
*H05B 47/19* (2020.01)
*H05B 47/25* (2020.01)

(52) U.S. Cl.
CPC ......... *H05B 47/198* (2024.01); *H05B 45/50* (2020.01); *H05B 47/14* (2020.01); *H05B 47/19* (2020.01); *H05B 47/25* (2020.01)

(58) Field of Classification Search
CPC .... H05B 47/19; H05B 47/16; H05B 47/1965; H05B 47/11; H05B 47/105; H05B 47/1985; H05B 45/10; H05B 45/20; H05B 47/115; H05B 45/3725; H05B 47/197; H05B 45/00; H05B 47/195; H05B 45/375; H05B 47/125; H05B 45/37; H05B 45/395; H05B 45/325; H05B 45/38; H05B 45/357; H05B 47/196; H05B 45/12; H05B 47/198; H05B 47/12; H05B 47/18; H05B 45/3578; H05B 45/385; H05B 45/50; H05B 47/199; H05B 47/1975; H05B 47/13; H05B 47/175; H05B 41/00; H05B 45/56; H05B 47/20; H05B 45/59; H05B 47/135; H05B 47/14; H05B 47/165; H05B 45/46; H05B 47/10; H05B 47/17; H05B 47/172; H05B 45/18; H05B 45/33; H05B 45/3575; H05B 45/382; H05B 45/397; H05B 47/155; H05B 47/23; H05B 47/25; Y02B 20/40

See application file for complete search history.

(56) References Cited

U.S. PATENT DOCUMENTS

| | | | |
|---|---|---|---|
| 8,373,364 B2 * | 2/2013 | Santo | G01R 31/2635 315/308 |
| 2017/0163439 A1 * | 6/2017 | Bosua | G08C 23/04 |

* cited by examiner

*Primary Examiner* — Monica C King
(74) *Attorney, Agent, or Firm* — Birch, Stewart, Kolasch & Birch, LLP

(57) ABSTRACT

A replaceable bulb lamp LED string device includes a bulb lamp LED string, a main memory, and a main controller. The main controller periodically detects a total power consumption value of the bulb lamp LED string. When the main controller determines that a variation of the total power consumption values between two adjacent periods of the bulb lamp LED string increases more than a standby power consumption threshold, the main controller executes a new address searching mode to detect an address of a bulb lamp LED installed in the bulb lamp LED string. The main controller further sequentially records the detected address into an address table stored in the main memory. Since the main controller can detect the address of the bulb lamp LED, a user can easily fix the replaceable bulb lamp LED string device without finding a vendor of the replaceable bulb lamp LED string device.

20 Claims, 6 Drawing Sheets

| SERIAL NUMBER | ADDRESS |
|---|---|
| 1 | |
| 2 | |

FIG.3A

| SERIAL NUMBER | ADDRESS |
|---|---|
| 1 | 000000 |
| 2 | |

FIG.3B

| SERIAL NUMBER | ADDRESS |
|---|---|
| 1 | 000000 |
| 2 | 111111 |

FIG.3C

REPLACEABLE BULB LAMP LED STRING DETECTIVE METHOD AND REPLACEABLE BULB LAMP LED STRING DEVICE

BACKGROUND OF THE INVENTION

1. Field of the Invention

The present invention relates to a detective method and a string device, and more particularly to a replaceable bulb lamp LED string detective method and a replaceable bulb lamp LED string device.

2. Description of the Related Art

A common lighting system includes a plurality of LED devices and a controller. The controller is electrically connected to the LED devices, and the LED devices each include a driver IC and R.G.B. LED chips. The driver IC integrates a demodulation logic unit, a driver, and a programmable address construction unit. The controller generates a control signal to control the LED devices, and the control signal includes an address code and three color codes.

The address construction unit stores an address code. The driver IC is electrically connected to the address construction unit and the R.G.B. LED chips. When the driver IC receives the control signal from the controller, the driver IC compares the address code of the control signal with the address code of the address construction unit. When the driver IC determines that the address code of the control signal matches the address code of the address construction unit, the driver IC controls the LED unit according to the color codes of the external control signal. Namely, a user can control the LED devices through the external controller.

Further, since the address codes of the LED devices are generated inside the LED devices, the controller can transmit a plurality of control signals to control each of the LED devices based on the address codes of the LED devices to perform any color combination for each LED device. The address codes of the LED devices can be generated to perform any picture frame or dynamic lighting effects.

However, since the controller should control all of the LED devices, the controller usually stores an address table to record the address codes of the LED devices. The address table stored in the controller is established by a vendor of the lighting system, and the user cannot erase the address table stored in the controller. When any one of the LED devices of the lighting system is abnormal, the dynamic lighting effects of the lighting system may be affected. The user needs to find the vendor of the lighting system to fix the lighting system, which is very inconvenient for the user. Therefore, the common lighting system needs to be further improved.

SUMMARY OF THE INVENTION

An objective of the present invention is to provide a replaceable bulb lamp LED string device and a replaceable bulb lamp LED string detective method. The present invention can detect and record an address of a bulb lamp LED. Therefore, a user can easily mount the bulb lamp LED of the replaceable bulb lamp LED string device on their own.

The replaceable bulb lamp LED string device includes a bulb lamp LED string, a main memory, and a main controller. The main memory stores an address table. The main controller is electrically connected to the bulb lamp LED string and the main memory.

The main controller executes a detective mode, in the detective mode, the main controller periodically detects a total power consumption value of the bulb lamp LED string, and determines whether a variation of the total power consumption values between two adjacent periods of the bulb lamp LED string increases more than a standby power consumption threshold.

When the variation of the total power consumption values between two adjacent periods of the bulb lamp LED string increases more than the standby power consumption threshold, the main controller executes a new address searching mode to detect a new address of a new bulb lamp LED installed in the bulb lamp LED string. The main controller further sequentially records the detected new address of the installed new bulb lamp LED into the address table stored in the main memory.

Moreover, the replaceable bulb lamp LED string detective method is executed by the main controller of the replaceable bulb lamp LED string device, includes a detective mode and a new address searching mode, and the detective mode comprises steps of:

periodically detecting a total power consumption value of a bulb lamp LED string of the replaceable bulb lamp LED string device;

determining whether a variation of the total power consumption values between two adjacent periods of the bulb lamp LED string increases more than a standby power consumption threshold; and when the variation of the total power consumption values between two adjacent periods of the bulb lamp LED string increases more than the standby power consumption threshold, executing the new address searching mode to detect a new address of a new bulb lamp LED installed in the bulb lamp LED string;

sequentially recording the detected address of the bulb lamp LED into an address table.

The present invention can determine whether the bulb lamp LED is installed in the bulb lamp LED string according to whether the variation of the total power consumption values between two adjacent periods of the bulb lamp LED string increases more than the standby power consumption threshold. Further, the present invention can detect the address of the bulb lamp LED by the new address searching mode. Therefore, the user can easily fix the replaceable bulb lamp LED string device without finding a vendor of the replaceable bulb lamp LED string device.

BRIEF DESCRIPTION OF THE DRAWINGS

FIGS. 3A to 3C are schematic diagrams for operating the replaceable bulb lamp LED string detective device of the present invention.

DETAILED DESCRIPTION OF THE INVENTION

Figure 1:
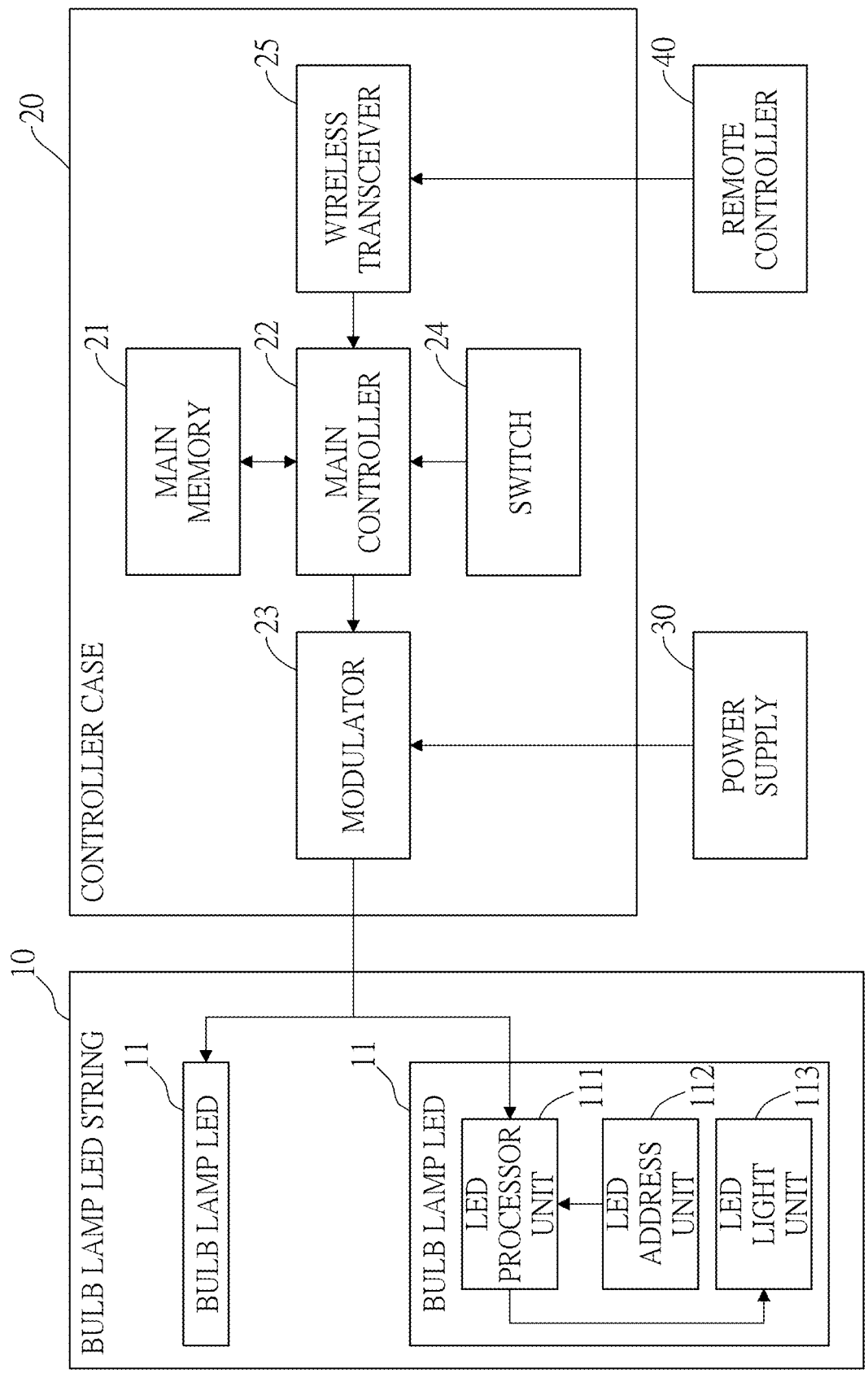
FIG. 1 is a block diagram of an embodiment of a replaceable bulb lamp LED string detective device of the present invention.

With reference to FIG. 1, the present invention relates to a replaceable bulb lamp LED string detective device and a replaceable bulb lamp LED string detective method.

The replaceable bulb lamp LED string device includes a bulb lamp LED string 10, a main memory 21, and a main controller 22. The main memory 21 stores an address table. The main controller 22 is electrically connected to the bulb lamp LED string 10 and the main memory 21.

The main controller 22 executes a detective mode. In the detective mode, the main controller periodically detects a total power consumption value of the bulb lamp LED string 10, and determines whether a variation of the total power consumption values between two adjacent periods of the bulb lamp LED string 10 increases more than a standby power consumption threshold.

When the variation of the total power consumption values between two adjacent periods of the bulb lamp LED string 10 increases more than the standby power consumption threshold, the main controller 22 executes a new address searching mode to detect a new address of a new bulb lamp LED 11 installed in the bulb lamp LED string 10. The main controller 22 further sequentially records the detected new address of the installed new bulb lamp LED 11 into the address table stored in the main memory 21.

The main controller 22 can determine whether the bulb lamp LED 11 is installed in the bulb lamp LED string 10 according to whether the variation of the total power consumption values between two adjacent periods of the bulb lamp LED string 10 increases more than the standby power consumption threshold. Further, the main controller 22 can detect the address of the bulb lamp LED 11 by the new address searching mode. Therefore, a user can easily fix the replaceable bulb lamp LED string device without finding a vendor of the replaceable bulb lamp LED string device.

Furthermore, in the new address searching mode, the main controller 22 executes the new address searching mode, the main controller 22 generates a scanning address according to an address protocol, generates a lighting signal corresponding to the scanning address, transmits the lighting signal to the bulb lamp LED string 10, and determines whether the variation of the total power consumption value of the bulb lamp LED string 10 increases more than a normal power consumption threshold. When the variation of the total power consumption value of the bulb lamp LED string 10 increases more than the normal power consumption threshold, the main controller 22 assigns the scanning address as the detected address of the installed new bulb lamp LED 11. When the variation of the total power consumption value of the bulb lamp LED string 10 increase less than the normal power consumption threshold, the main controller 22 generates another scanning address of a next sequence according to the address protocol, and generates the lighting signal corresponding to the scanning address of the next sequence, transmits the lighting signal to the bulb lamp LED string, and determines whether the variation of the total power consumption value of the bulb lamp LED string increases more than the normal power consumption threshold again.

For example, the address protocol includes all kinds of the addresses of the bulb lamp LED 11. For example, the addresses of the bulb lamp LED 11 may consist of 6 binary codes, such as "000000", "111100", etc. Namely, the address protocol may include the addresses from "000000" to "111111".

Moreover, in one embodiment, the normal power consumption threshold increases more than the standby power consumption threshold.

Further, the bulb lamp LED 11 installed in the bulb lamp LED string 10 includes an LED processor unit 111, an LED address unit 112, and an LED light unit 113.

The LED processor unit 111 is electrically connected to the main controller 22. The LED address unit 112 is electrically connected to the LED processor unit 111, and comprises the address of the bulb lamp LED 11. The LED light unit 113 is electrically connected to the LED processor unit 111, and is controlled by the LED processor unit 111.

When the LED processor unit 111 receives the lighting signal, the LED processor unit 111 authorizes the scanning address of the lighting signal. When the scanning address of the lighting signal is authorized, the LED processor unit 111 lights the LED light unit 113.

For example, when the LED processor unit 111 authorizes the scanning address of the lighting signal, the LED processor unit 111 determines whether the scanning address of the lighting signal matches with the address of the bulb lamp LED 11 in the LED address unit 112. When the scanning address of the lighting signal matches with the address of the bulb lamp LED 11 in the LED address unit 112, the scanning address of the lighting signal is authorized.

In one embodiment, the LED address unit 112 of the bulb lamp LED 11 installed in the bulb lamp LED string 10 is a non-volatile memory, and the non-volatile memory may be a flash memory, a one-time programmable (OTP) memory, or a multiple-time programmable (MTP) memory.

In another embodiment, the LED address unit 112 of the bulb lamp LED 11 installed in the bulb lamp LED string 10 may be a fuse memory, the fuse memory includes programmable fuses, and the programmable fuses are metal fuses or poly-fuses. Further, the programmable metal fuses may be programed by laser trimming or pad trimming.

For example, when the bulb lamp LED string 10 does not install any bulb lamp LED 11, a total power consumption value of the bulb lamp LED string 10 may be 0 watt.

Figure 2A:
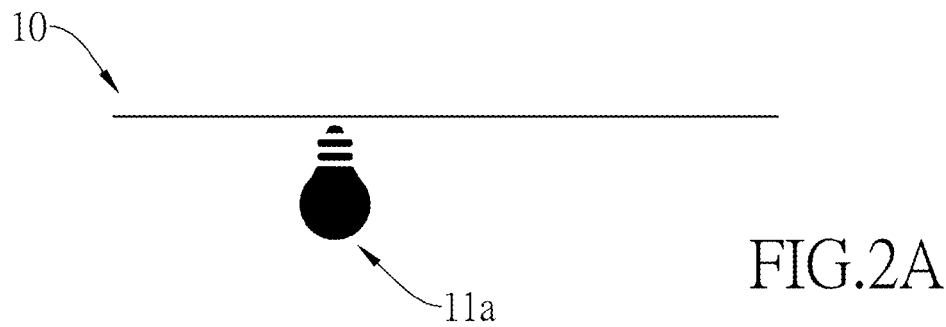
FIGS. 2A to 2D are schematic diagrams of an address table of the replaceable bulb lamp LED string detective device of the present invention.

With reference to FIG. 2A, when the first bulb lamp LED 11a is installed in the bulb lamp LED string 10, the first bulb lamp LED 11a may not light initially, but the first bulb lamp LED 11a may cause a standby power consumption. Therefore, the power consumption value of the bulb lamp LED string 10 may increase the standby power consumption threshold. Namely, when the main controller 22 determines that the variation of the total power consumption values between two adjacent periods of the bulb lamp LED string 10 increases more than the standby power consumption threshold, it can be determined that the first bulb lamp LED 11a is installed in the bulb lamp LED string 10. Then, the main controller 22 executes the new address searching mode to detect the new address of the first bulb lamp LED 11a installed in the bulb lamp LED string 10.

Figure 2B:
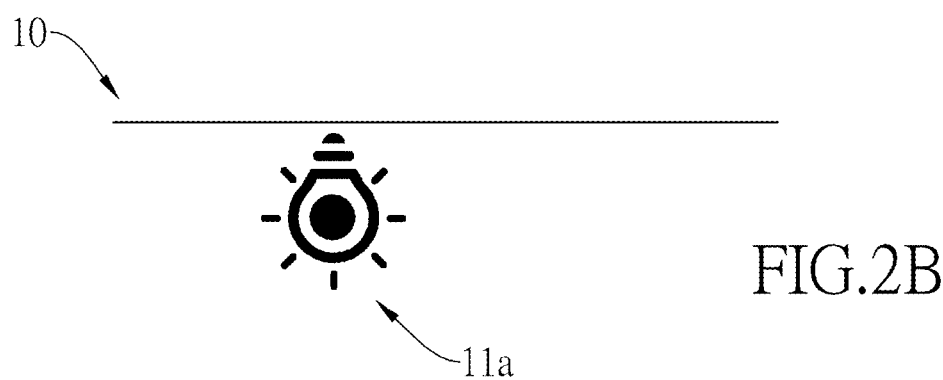

With reference to FIG. 2B, when the main controller 22 detects the address of the first bulb lamp LED 11a, the first bulb lamp LED 11a may be lighted, and the main controller 22 can record the detected new address of the first bulb lamp LED 11a into the address table stored in the main memory 21.

Figure 2C:
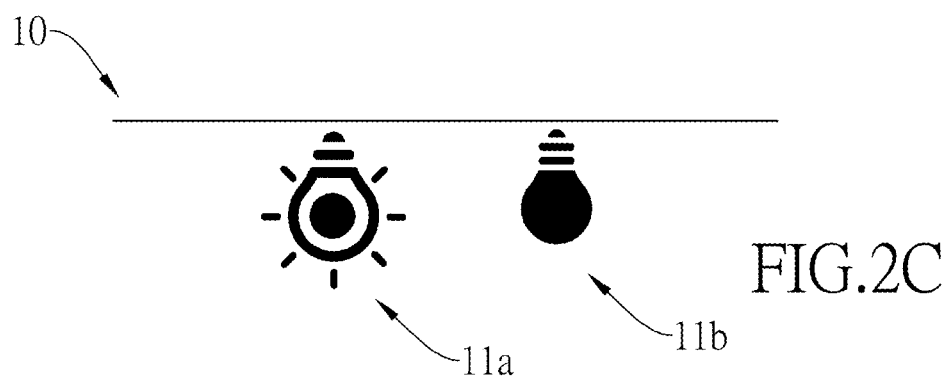

With reference to FIG. 2C, when the second bulb lamp LED 11b is installed in the bulb lamp LED string 10, the second bulb lamp LED 11b may not light initially, but the second bulb lamp LED 11b may also cause the standby power consumption. Therefore, the total power consumption value of the bulb lamp LED string 10 may increase the standby power consumption threshold. Namely, when the main controller 22 determines that the variation of the total power consumption values between two adjacent periods of the bulb lamp LED string 10 increases more than the standby power consumption threshold, it can be determined that the second bulb lamp LED 11b is installed in the bulb lamp LED string 10. Then, the main controller 22 executes the new address searching mode to detect the address of the second bulb lamp LED 11b installed in the bulb lamp LED string 10.

Figure 2D:
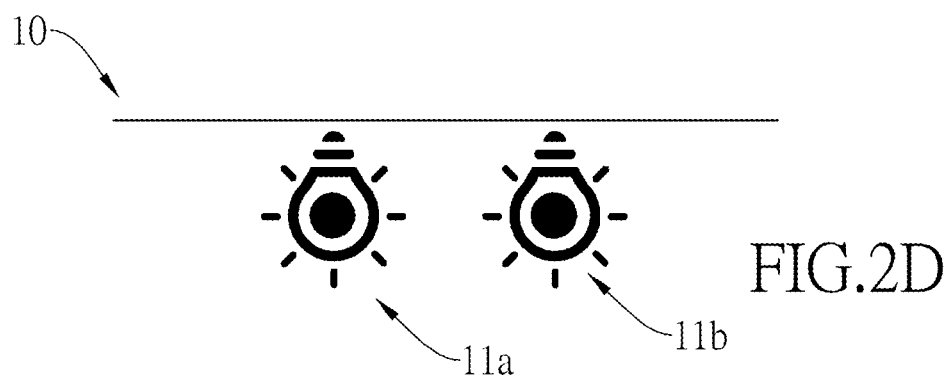

With reference to FIG. 2D, when the main controller 22 detects the address of the second bulb lamp LED 11b, the second bulb lamp LED 11b may be lighted, and the main controller 22 can record the detected address of the second bulb lamp LED 11b into the address table stored in the main memory 21.

Moreover, with reference to FIG. 3A, the address table stored in the main memory 21 may initially be a blank table.

With reference to FIG. 3B, when the main controller 22 detects the address of the first installed bulb lamp LED 11a, the main controller 22 can record the detected address of the first installed bulb lamp LED 11a into the address table stored in the main memory 21 with the first serial number, such as "000000" recorded with the first serial number.

With reference to FIG. 3C, when the main controller 22 detects the address of the secondly installed bulb lamp LED 11b, the main controller 22 can record the detected address of the secondly installed bulb lamp LED 11b into the address table stored in the main memory 21 with the second serial number, such as "111111" recorded with the second serial number.

Namely, the address table may be established according to installation orders of the bulb lamp LEDs 11 installed in the bulb lamp LED string 10.

Further, the address table may record a plurality of sequence code and a plurality of addresses of bulb lamp LEDs 11 installed in the bulb lamp LED string 10. Each of the addresses recorded in the address table corresponds to one of the sequence codes, and the sequence codes may correspond to the installation orders of the bulb lamp LEDs 11 installed in the bulb lamp LED string 10.

Further, when the variation of the total power consumption values between two adjacent periods of the bulb lamp LED string 10 increases less than the standby power consumption threshold, the main controller 22 further determines whether the variation of the total power consumption values between two adjacent periods of the bulb lamp LED string 10 decreases more than the standby power consumption threshold.

When the variation of the total power consumption values between two adjacent periods of the bulb lamp LED string 10 decreases more than the standby power consumption threshold, the main controller executes a removed address searching mode to detect a removed address of a removed bulb lamp LED, executes the new address searching mode to detect the new address of the new bulb lamp LED installed in the bulb lamp LED string 10, and further replaces the removed address by the detected new address in the address table.

Furthermore, in the removed address searching mode, the main controller 22 loads one of addresses stored in the address table, generates the lighting signal corresponding to the loaded address, transmits the lighting signal to the bulb lamp LED string 10, and determines whether the variation of the total power consumption value of the bulb lamp LED string increases less than the normal power consumption threshold.

When the variation of the total power consumption value of the bulb lamp LED string 10 increases less than the normal power consumption threshold, the main controller 22 assigns the loaded address as the detected removed address of the removed bulb lamp LED.

When the variation of the total power consumption value of the bulb lamp LED string 10 increases more than the normal power consumption threshold, the main controller 22 loads another address stored in the address table, generates the lighting signal corresponding to the loaded address of the next sequence, transmits the lighting signal to the bulb lamp LED string 10, and determines whether the variation of the total power consumption value of the bulb lamp LED string 10 increases less than the normal power consumption threshold again.

With reference to FIG. 1, the replaceable bulb lamp LED string detective device further includes a modulator 23, a power supply 30, a switch 24, a remote controller 40, and a wireless transceiver 25.

The main controller 22 is electrically connected to the bulb lamp LED string 10 through the modulator 23. The power supply 30 is electrically connected to the modulator 23. The modulator 23 modulates signals from the main controller 22 and electric power from the power supply 30.

Therefore, the modulator 23 can transmit signals to the bulb lamp LEDs 11 installed in the bulb lamp LED string 10 on power lines. Namely, the modulator 23 can be electrically connected to the bulb lamp LEDs 11 installed in the bulb lamp LED string 10 by just two lines for simultaneously transmitting the electric power and the signals.

The remote controller 40 generates a remote signal, and wirelessly transmits the remote signal. The wireless transceiver 25 is electrically connected to the main controller 22 and wirelessly connected to the remote controller 40. The main controller 22 receives the remote signal through the wireless transceiver 25, generates a control signal according to the remote signal, and transmits the control signal to the bulb lamp LED string 10.

Therefore, the user can turn on the replaceable bulb lamp LED string detective device through the remote controller 40.

The switch 24 is electrically connected to the main controller 22, and generates a switch signal. The main controller 22 receives the switch signal, generates the control signal according to the switch signal, and transmits the control signal to the bulb lamp LED string 10.

Namely, when the remote controller 30 is abnormal, the user can still use the switch 24 to generate the control signal.

In one embodiment, the main memory 21, the main controller 22, the modulator 23, and the wireless transceiver 25 may be mounted in a controller case 20, and the switch 24 may be mounted on a surface of the controller case 20.

Figure 4:
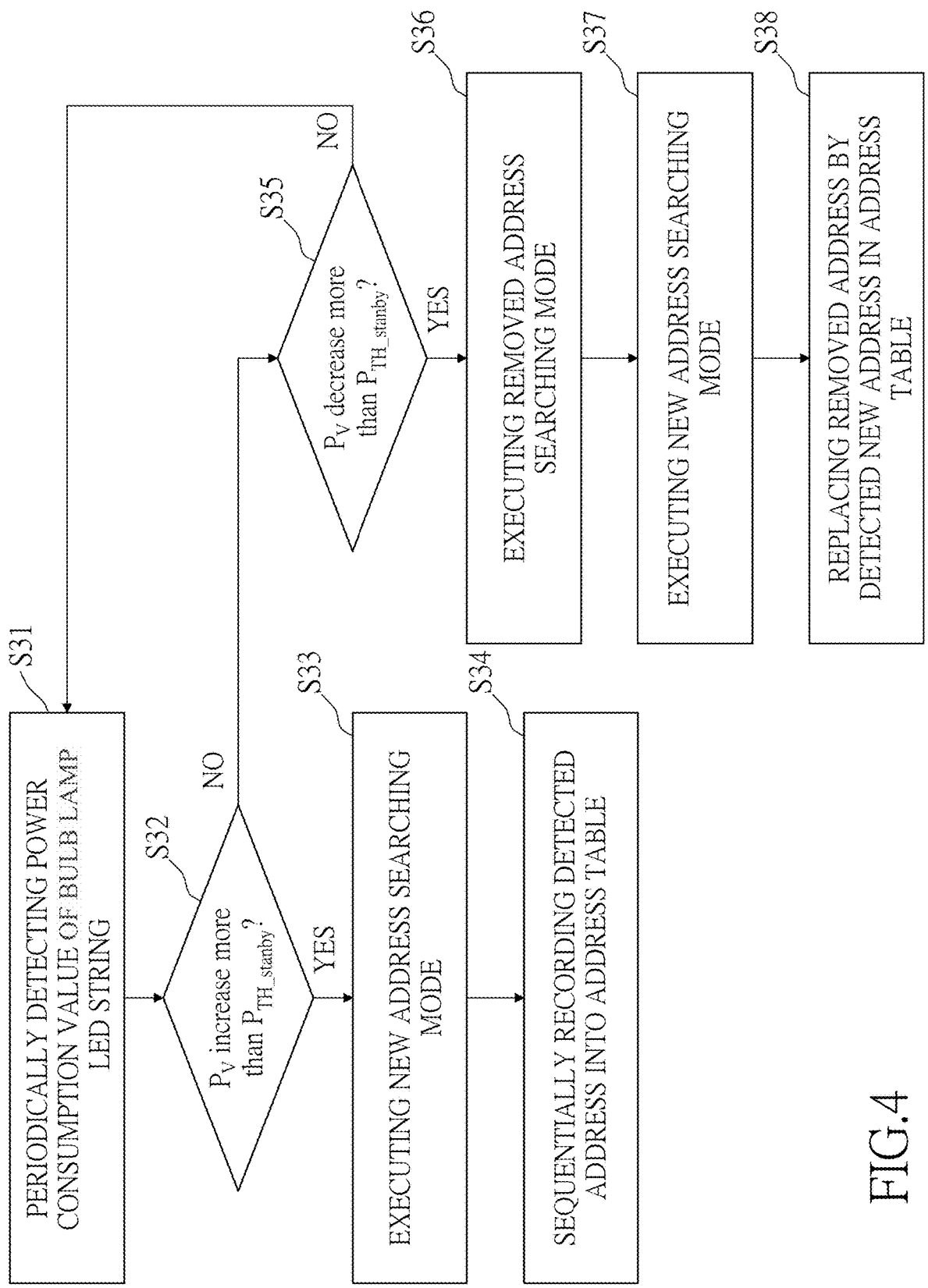
FIGS. 4 to 6 are flowcharts of an embodiment of a replaceable bulb lamp LED string detective method of the present invention.

With reference to FIG. 4, the replaceable bulb lamp LED string detective method is executed by the main controller 22 of the replaceable bulb lamp LED string device, and includes a detective mode and a new address searching mode. The detective mode comprises steps of:

Step S31: periodically detecting a total power consumption value of the bulb lamp LED string of the replaceable bulb lamp LED string device;

Step S32: determining whether the variation $P_V$ of the total power consumption values between two adjacent periods of the bulb lamp LED string 10 increases more than the standby power consumption threshold $P_{TH\_stansby}$; and Step S33: when the variation $P_V$ of the total power consumption values between two adjacent periods of the bulb lamp LED string 10 increases more than the standby power consumption threshold $P_{TH\_stansby}$, executing the new address searching mode to detect the new address of the new bulb lamp LED 11 installed in the bulb lamp LED string 10;

Step S34: sequentially recording the detected address of the bulb lamp LED 11 into the address table;

Step S35: when the variation $P_V$ of the total power consumption values between two adjacent periods of the bulb lamp LED string increases less than the standby power consumption threshold, determining whether the variation $P_V$ of the total power consumption values between two adjacent periods of the bulb lamp LED string decreases more than the standby power consumption threshold;

Step S36: when the variation of the total power consumption values between two adjacent periods of the bulb lamp LED string decreases more than the standby power consumption threshold, executing a removed address searching mode to detect a removed address of a removed bulb lamp LED;

Step S37: executing the new address searching mode to detect the new address of the new bulb lamp LED installed in the bulb lamp LED string;

Step S38: replacing the removed address by the detected new address in the address table.

Figure 5:
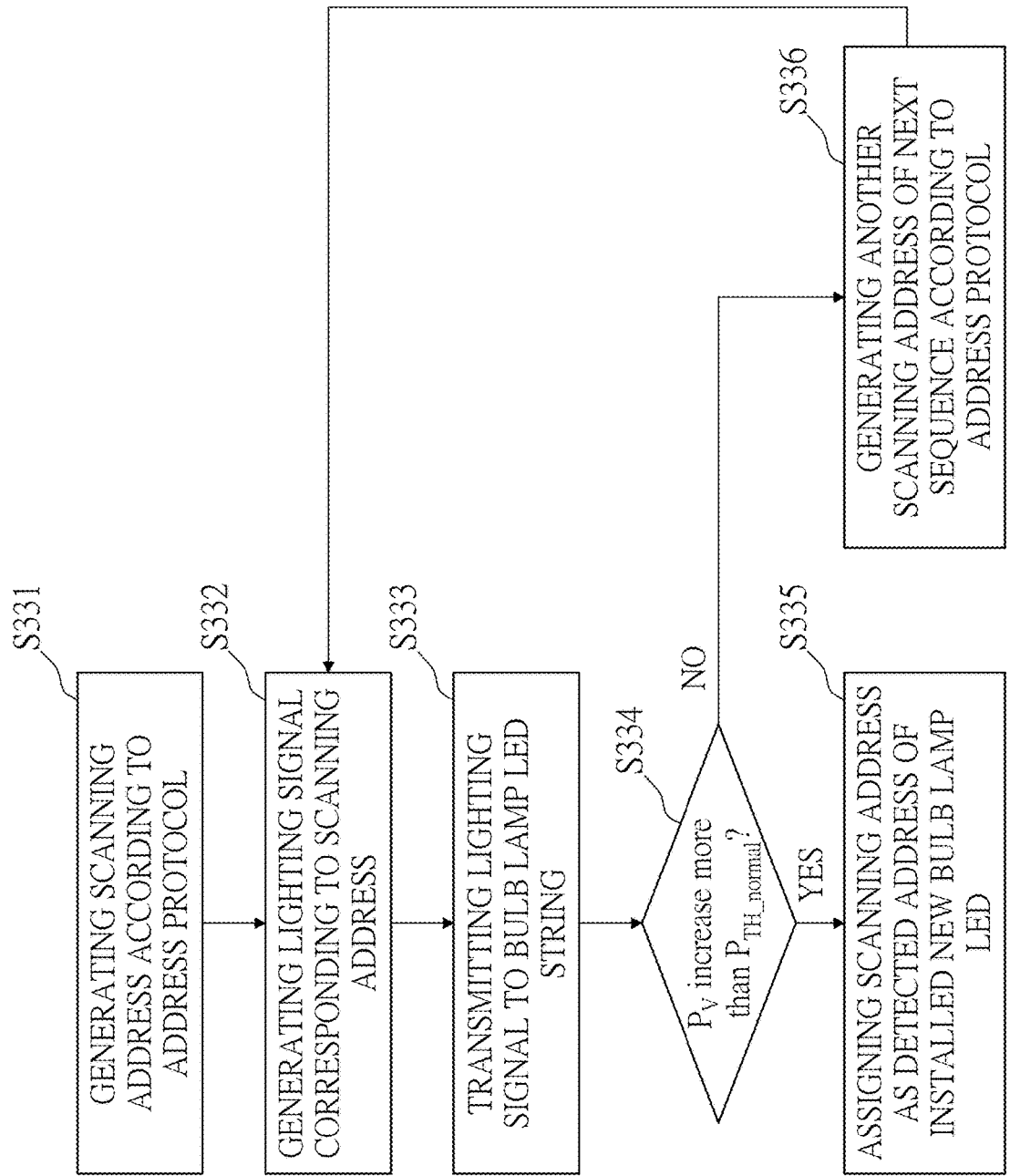

Further, with reference to FIG. 5, the new address searching mode includes steps of:

Step S331: generating the scanning address according to an address protocol;

Step S332: generating the lighting signal corresponding to the scanning address;

Step S333: transmitting the lighting signal to the bulb lamp LED string 10;

Step S334: determining whether the variation $P_V$ of the total power consumption value of the bulb lamp LED string 10 increases more than a normal power consumption threshold $P_{TH\_normal}$;

Step S335: when the variation $P_V$ of the total power consumption value of the bulb lamp LED string 10 increases more than the normal power consumption threshold $P_{TH\_normal}$, assigning the scanning address as the detected address of the installed new bulb lamp LED 11;

Step S336: when the variation $P_V$ of the total power consumption value of the bulb lamp LED string 10 increase less than the normal power consumption threshold $P_{TH\_normal}$, generates another scanning address of a next sequence according to the address protocol, generating the lighting signal corresponding to the scanning address of the next sequence (S332), transmitting the lighting signal to the bulb lamp LED string (S333), and determining whether the variation of the total power consumption value of the bulb lamp LED string increases more than the normal power consumption threshold again (S334).

Figure 6:
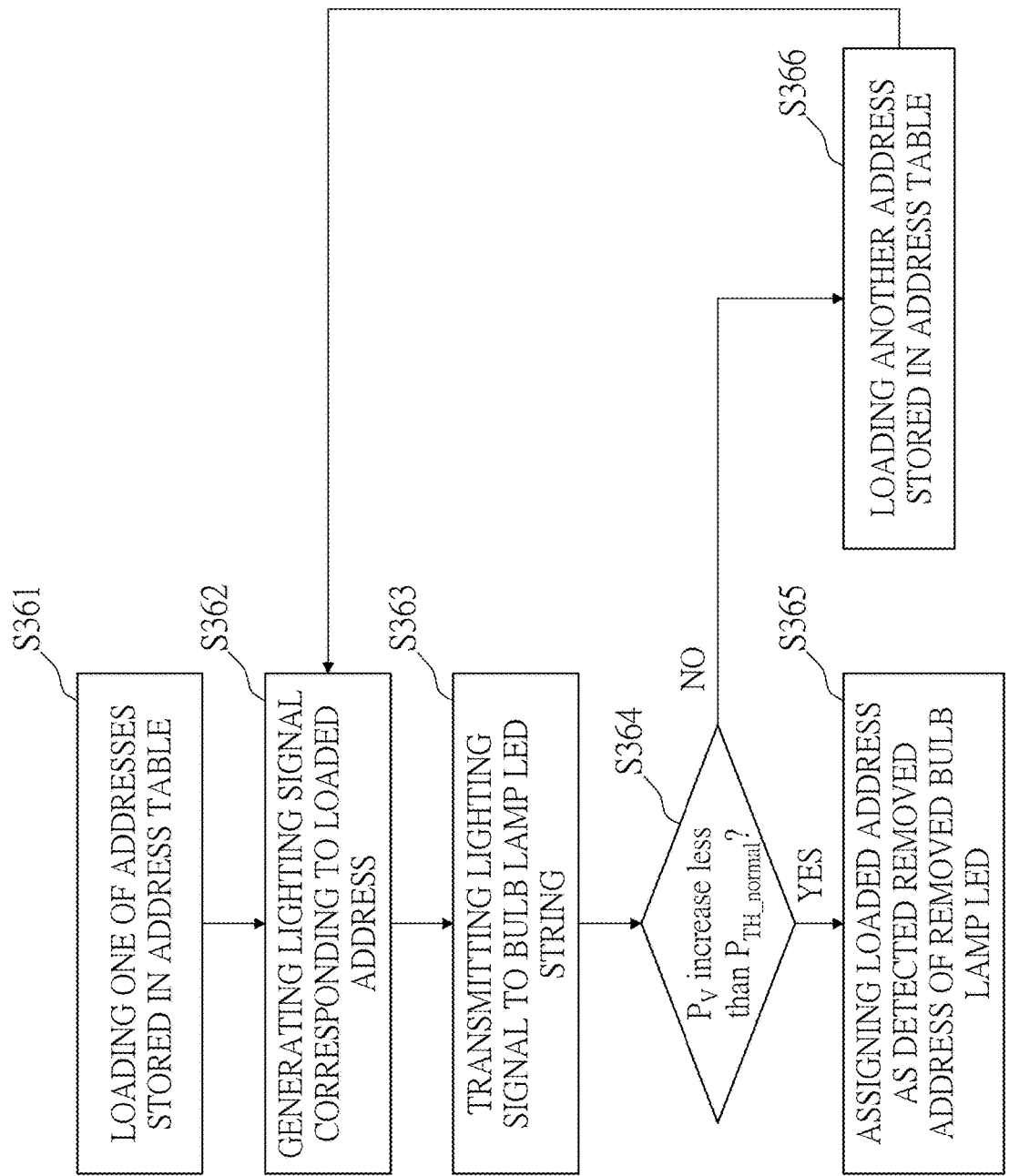

Moreover, with reference to FIG. 6, the removed address searching mode includes steps of:

Step S361: loading one of addresses stored in the address table;

Step S362: generating a lighting signal corresponding to the loaded address;

Step S363: transmitting the lighting signal to the bulb lamp LED string,

Step S364: determining whether the variation $P_V$ of the total power consumption value of the bulb lamp LED string increases less than a normal power consumption threshold $P_{TH\_normal}$;

Step S365: when the variation $P_V$ of the total power consumption value of the bulb lamp LED string increases less than the normal power consumption threshold $P_{TH\_normal}$, assigning the loaded address as the detected removed address of the removed bulb lamp LED;

Step S366: when the variation of the total power consumption value of the bulb lamp LED string increases more than the normal power consumption threshold, loading another address stored in the address table, generating the lighting signal corresponding to the loaded address of the next sequence (S362), transmitting the lighting signal to the bulb lamp LED string (S363), and determining whether the variation of the total power consumption value of the bulb lamp LED string increases less than the normal power consumption threshold again (S364).

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A replaceable bulb lamp light emitting diode (LED) string device, comprising:
   a bulb lamp LED string;
   a main memory, storing an address table;
   a main controller, electrically connected to the bulb lamp LED string and the main memory;
   wherein the main controller executes a detective mode, in the detective mode, the main controller periodically detects a total power consumption value of the bulb lamp LED string, and determines whether a variation of the total power consumption values between two adjacent periods of the bulb lamp LED string increases more than a standby power consumption threshold;
   wherein when the variation of the total power consumption values between two adjacent periods of the bulb lamp LED string increases more than the standby power consumption threshold, the main controller executes a new address searching mode to detect a new address of a new bulb lamp LED installed in the bulb lamp LED string;
   wherein the main controller further sequentially records the detected new address of the installed new bulb lamp LED into the address table stored in the main memory.

2. The replaceable bulb lamp LED string detective device as claimed in claim 1, wherein in the new address searching mode, the main controller generates a scanning address according to an address protocol, generates a lighting signal corresponding to the scanning address, transmits the lighting signal to the bulb lamp LED string, and determines whether the variation of the total power consumption value of the bulb lamp LED string increases more than a normal power consumption threshold;
   wherein when the variation of the total power consumption value of the bulb lamp LED string increases more than the normal power consumption threshold, the main controller assigns the scanning address as the detected address of the installed new bulb lamp LED;
   wherein when the variation of the total power consumption value of the bulb lamp LED string increase less than the normal power consumption threshold, the main controller generates another scanning address of a next sequence according to the address protocol, generates the lighting signal corresponding to the scanning address of the next sequence, transmits the lighting signal to the bulb lamp LED string, and determines whether the variation of the total power consumption value of the bulb lamp LED string increases more than the normal power consumption threshold again.

3. The replaceable bulb lamp LED string detective device as claimed in claim 1, wherein when the variation of the total power consumption values between two adjacent periods of the bulb lamp LED string increases less than the standby power consumption threshold, the main controller further determines whether the variation of the total power consumption values between two adjacent periods of the bulb lamp LED string decreases more than the standby power consumption threshold;

wherein when the variation of the total power consumption values between two adjacent periods of the bulb lamp LED string decreases more than the standby power consumption threshold, the main controller executes a removed address searching mode to detect a removed address of a removed bulb lamp LED, executes the new address searching mode to detect the new address of the new bulb lamp LED installed in the bulb lamp LED string, and further replaces the removed address by the detected new address in the address table.

4. The replaceable bulb lamp LED string detective device as claimed in claim 3, wherein in the removed address searching mode, the main controller loads one of addresses stored in the address table, generates a lighting signal corresponding to the loaded address, transmits the lighting signal to the bulb lamp LED string, and determines whether the variation of the total power consumption value of the bulb lamp LED string increases less than a normal power consumption threshold;

wherein when the variation of the total power consumption value of the bulb lamp LED string increases less than the normal power consumption threshold, the main controller assigns the loaded address as the detected removed address of the removed bulb lamp LED;

wherein when the variation of the total power consumption value of the bulb lamp LED string increases more than the normal power consumption threshold, the main controller loads another address stored in the address table, generates the lighting signal corresponding to the loaded address of the next sequence, transmits the lighting signal to the bulb lamp LED string, and determines whether the variation of the total power consumption value of the bulb lamp LED string increases less than the normal power consumption threshold again.

5. The replaceable bulb lamp LED string detective device as claimed in claim 2, wherein the normal power consumption threshold increases more than the standby power consumption threshold.

6. The replaceable bulb lamp LED string detective device as claimed in claim 1, wherein the bulb lamp LED installed in the bulb lamp LED string comprises:

an LED processor unit, electrically connected to the main controller;
an LED address unit, electrically connected to the LED processor unit, and comprising the address of the bulb lamp LED; and
an LED light unit, electrically connected to the LED processor unit, and controlled by the LED processor unit.

7. The replaceable bulb lamp LED string detective device as claimed in claim 6, wherein the LED address unit of the bulb lamp LED installed in the bulb lamp LED string is a non-volatile memory.

8. The replaceable bulb lamp LED string detective device as claimed in claim 7, wherein the non-volatile memory is a flash memory, a one-time programmable (OTP) memory, or a multiple-time programmable (MTP) memory.

9. The replaceable bulb lamp LED string detective device as claimed in claim 6, wherein the LED address unit of the bulb lamp LED installed in the bulb lamp LED string is a fuse memory.

10. The replaceable bulb lamp LED string detective device as claimed in claim 9, wherein the fuse memory comprises programmable fuses, and the programmable fuses are metal fuses or poly-fuses.

11. The replaceable bulb lamp LED string detective device as claimed in claim 10, wherein the programmable metal fuses are programed by laser trimming or pad trimming.

12. The replaceable bulb lamp LED string detective device as claimed in claim 2, wherein the bulb lamp LED installed in the bulb lamp LED string comprises:

an LED processor unit, electrically connected to the main controller;
an LED address unit, electrically connected to the LED processor unit, and storing the address of the bulb lamp LED; and
an LED light unit, electrically connected to the LED processor unit, and controlled by the LED processor unit;
wherein when the LED processor unit receives the lighting signal, the LED processor unit authorizes the scanning address of the lighting signal;
wherein when the scanning address of the lighting signal is authorized, the LED processor unit lights the LED light unit.

13. The replaceable bulb lamp LED string detective device as claimed in claim 12, wherein when the LED processor unit authorizes the scanning address of the lighting signal, the LED processor unit determines whether the scanning address of the lighting signal matches with the address of the bulb lamp LED stored in the LED address unit;

wherein when the scanning address of the lighting signal matches with the address of the bulb lamp LED stored in the LED address unit, the scanning address of the lighting signal is authorized.

14. The replaceable bulb lamp LED string detective device as claimed in claim 1, further comprising:

a modulator; wherein the main controller is electrically connected to the bulb lamp LED string through the modulator; and
a power supply, electrically connected to the modulator; wherein the modulator modulates signals from the main controller and electric power from the power supply.

15. The parallel connection LED lighting system as claimed in claim 1, wherein the main controller further comprises:

a switch, electrically connected to the main controller, and generating a switch signal;

wherein the main controller receives the switch signal, generates a control signal according to the switch signal, and transmits the control signal to the bulb lamp LED string.

16. The replaceable bulb lamp LED string detective device as claimed in claim 1, further comprising:
   a remote controller, generating a remote signal, and wirelessly transmitting the remote signal;
   a wireless transceiver, electrically connected to the main controller, and wirelessly connected to the remote controller;
   wherein the main controller receives the remote signal through the wireless transceiver, generates a control signal according to the remote signal, and transmits the control signal to the bulb lamp LED string.

17. A replaceable bulb lamp LED string detective method, executed by a main controller of a replaceable bulb lamp LED string device, and comprising a detective mode and a new address searching mode; wherein the detective mode comprises steps of:
   periodically detecting a total power consumption value of a bulb lamp LED string of the replaceable bulb lamp LED string device;
   determining whether a variation of the total power consumption values between two adjacent periods of the bulb lamp LED string increases more than a standby power consumption threshold; and
   when the variation of the total power consumption values between two adjacent periods of the bulb lamp LED string increases more than the standby power consumption threshold, executing the new address searching mode to detect a new address of a new bulb lamp LED installed in the bulb lamp LED string;
   sequentially recording the detected address of the new bulb lamp LED into an address table.

18. The replaceable bulb lamp LED string detective method as claimed in claim 15, wherein the new address searching mode comprises steps of:
   generating a scanning address according to an address protocol;
   generating a lighting signal corresponding to the scanning address;
   transmitting the lighting signal to the bulb lamp LED string;
   determining whether the variation of the total power consumption value of the bulb lamp LED string increases more than a normal power consumption threshold;
   when the variation of the total power consumption value of the bulb lamp LED string increases more than the normal power consumption threshold, assigning the scanning address as the detected address of the installed new bulb lamp LED;
   when the variation of the total power consumption value of the bulb lamp LED string increase less than the normal power consumption threshold, generates another scanning address of a next sequence according to the address protocol, generating the lighting signal corresponding to the scanning address of the next sequence, transmitting the lighting signal to the bulb lamp LED string, and determining whether the variation of the total power consumption value of the bulb lamp LED string increases more than the normal power consumption threshold again.

19. The replaceable bulb lamp LED string detective method as claimed in claim 17, wherein the detective mode further comprises steps of:
   when the variation of the total power consumption values between two adjacent periods of the bulb lamp LED string increases less than the standby power consumption threshold, determining whether the variation of the total power consumption values between two adjacent periods of the bulb lamp LED string decreases more than the standby power consumption threshold;
   when the variation of the total power consumption values between two adjacent periods of the bulb lamp LED string decreases more than the standby power consumption threshold, executing a removed address searching mode to detect a removed address of a removed bulb lamp LED, executing the new address searching mode to detect the new address of the new bulb lamp LED installed in the bulb lamp LED string, and further replacing the removed address by the detected new address in the address table.

20. The replaceable bulb lamp LED string detective method as claimed in claim 19, wherein the removed address searching mode comprises steps of:
   loading one of addresses stored in the address table, generating a lighting signal corresponding to the loaded address, transmitting the lighting signal to the bulb lamp LED string, and determining whether the variation of the total power consumption value of the bulb lamp LED string increases less than a normal power consumption threshold;
   when the variation of the total power consumption value of the bulb lamp LED string increases less than the normal power consumption threshold, assigning the loaded address as the detected removed address of the removed bulb lamp LED;
   when the variation of the total power consumption value of the bulb lamp LED string increases more than the normal power consumption threshold, loading another address stored in the address table, generating the lighting signal corresponding to the loaded address of the next sequence, transmitting the lighting signal to the bulb lamp LED string, and determining whether the variation of the total power consumption value of the bulb lamp LED string increases less than the normal power consumption threshold again.

* * * * *